(12) United States Patent
Katsuragawa

(10) Patent No.: US 6,243,193 B1
(45) Date of Patent: Jun. 5, 2001

(54) MAGNETO-OPTICAL LIGHT MODULATOR

(75) Inventor: Tadao Katsuragawa, Zama (JP)

(73) Assignee: Ricoh Company, Ltd., Yokohama (JP)

( * ) Notice: Subject to any disclaimer, the term of this patent is extended or adjusted under 35 U.S.C. 154(b) by 0 days.

(21) Appl. No.: 09/305,468

(22) Filed: May 6, 1999

(30) Foreign Application Priority Data

May 6, 1998 (JP) ................................................. 10-123583

(51) Int. Cl.[7] .................................................... G02F 1/09
(52) U.S. Cl. ............................................ 359/280; 359/281
(58) Field of Search ................................... 359/280, 281, 359/484, 501, 599, 284

(56) References Cited

U.S. PATENT DOCUMENTS

| | | | |
|---|---|---|---|
| 5,112,701 | 5/1992 | Katsuragawa | 428/694 |
| 5,212,446 * | 5/1993 | Itoh et al. | 324/244.1 |
| 5,386,313 * | 1/1995 | Szegedi et al. | 359/280 |
| 5,612,813 * | 3/1997 | Damman et al. | 359/281 |
| 5,991,075 * | 11/1999 | Katsuragawa et al. | 359/486 |
| 6,055,215 * | 4/2000 | Katsuragawa | 369/13 |
| 6,072,174 * | 6/2000 | Togawa et al. | 250/225 |

* cited by examiner

*Primary Examiner*—Georgia Epps
*Assistant Examiner*—Saeed Seyrafi
(74) *Attorney, Agent, or Firm*—Oblon, Spivak, McClelland, Maier & Neustadt, P.C.

(57) ABSTRACT

A magneto-optical light modulator includes a first polarizer, a transparent magneto-optical component including a magneto-optical film deposited on a surface of a substrate, and a second polarizer. The surface of the substrate includes features having a depth in a range of 0.1 $\mu$m to 5 $\mu$m. Side surfaces of the features are covered with the magneto-optical film to a thickness of 5 nm to 200 nm. Light flux from a light source passes through the first polarizer, the magneto-optical component and the second polarizer. Changes in incident light flux intensity can lead to rapid changes in the intensity of light flux transmitted through the magneto-optical light modulator.

18 Claims, 3 Drawing Sheets

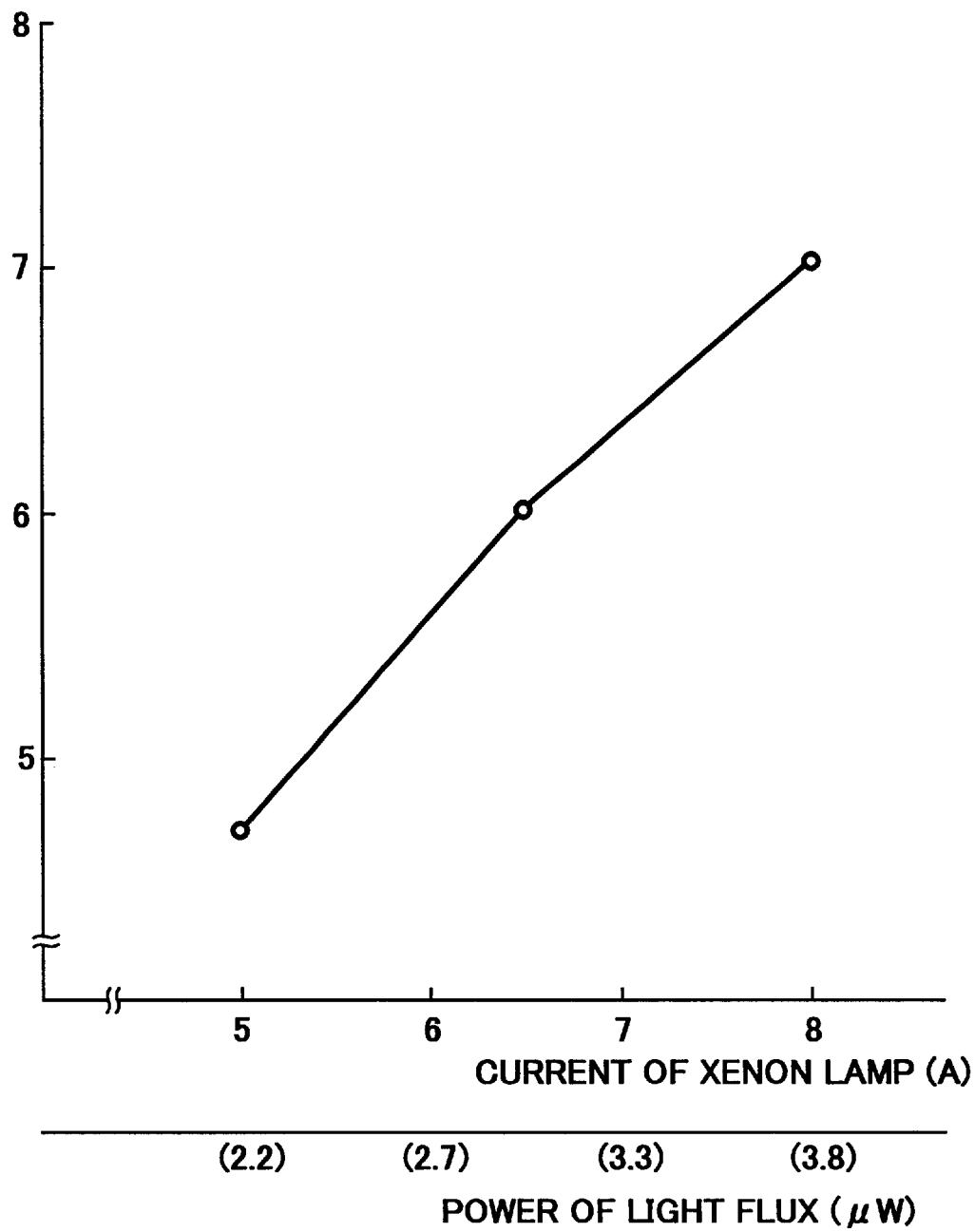

MAGNETO-OPTICAL LIGHT MODULATOR

BACKGROUND OF THE INVENTION

1. Field of the Invention

This invention relates to a magneto-optical light modulator which modulates transmission of light. In particular, the invention relates to a magneto-optical shutter device, which is capable of switching transmittance in response to a variation in incident light intensity and which may be incorporated into a light computing system, an image forming system, or an optical image processing system.

2. Description of Related Art

In the field of magneto-optical devices, several magneto-optical components including a magnetic film deposited on a grooved surface of a substrate, and an image display device using the components, have been disclosed by the present inventor in Japanese Laid-Open Patent Publication Nos. 10-213785, No. 11-7626, No. 11-8120, and No. 11-14814. However, a magneto-optical modulator that utilizes a magneto-optical component having a magneto-optical effect and that exhibits a dependence on intensity of incident light has not been disclosed.

In the field of light modulators, optical switches or optical shutters, which are able to operate faster than known electric switching devices, are known. Such light modulators include nonlinear optical materials having large nonlinear effect, such as artificially fabricated semiconductors having a superstructure, or specific organic materials, in order to achieve operation under the reduced intensity of light.

When the nonlinear material is employed in an optical switch having a micro-resonator, transmittance of a light flux can be controlled in response to a variation of intensity of the light flux. This is referred to as a "light-to-light gate component" or "all-light gate component". The light-to-light gate component can operate with a short switching time. For example, a light modulator having a nonlinear material, which has a laminated film-structure in which gallium arsenide (GaAs) semiconductor thin films and aluminum gallium arsenide (AlGaAs) semiconductor thin films are alternatively deposited with a pitch of no more than 10 nm, can operate with a switching time of 0.5 picoseconds.

A variety of devices such as logic devices and memory devices can be fabricated by assembling the light-to-light gate components. For example, a light computing system can be built using such components. Improvements in the switching speeds of the above-mentioned modulators is necessary to achieve a light computing system capable of operating at a high frequency.

Thus, there is a need for a magneto-optical light modulator that utilizes a magneto-optical film to perform high speed switching in response to variations in incident light flux.

SUMMARY OF THE INVENTION

The present invention provides a novel magneto-optical modulator, which can operate in response to variations in incident light intensity and which is capable of operating with a short switching time.

In embodiments of the invention, a magneto-optical light modulator is provided including a first polarizer arranged to receive an incident light flux and to transmit a polarized light flux; a transparent magneto-optical component arranged to receive the polarized light flux and to transmit a rotated polarized light flux; and a second polarizer arranged to receive the rotated polarized light flux. The transparent magneto-optical component includes a substrate with a textured surface substantially parallel to a major surface plane of the substrate. As used herein, the term "major surface plane" refers to a plane generally formed by one of two opposing sides of a substrate that have larger surface areas than other sides of the substrate. The substrate can include two opposing textured surfaces. Each textured surface includes features having a depth in a range of from about 0.1 $\mu$m to about 5 $\mu$m. The features can be substantially uniform in shape and size, and can be spaced periodically on the textured surface. Each feature includes a side surface that is not parallel to the major surface plane. A magneto-optical film between about 5 nm and about 200 nm thick covers at least a portion of the side surfaces.

In other embodiments, the substrate has a textured surface including a plurality of straight grooves spaced periodically in parallel with each other on the surface. Each of the plurality of grooves has a depth in a range of from about 0.1 $\mu$m to about 5 $\mu$m and a width in a range of from about 0.2 $\mu$m to about 2 $\mu$m.

In embodiments of the invention, an axis of the second polarizer, which corresponds to a plane of polarization, is oriented such that a transmittance of light flux by the second polarizer increases with an increase in incident light flux intensity directed at the first polarizer. In other embodiments, an axis of the second polarizer is oriented such that a transmittance of light flux by the second polarizer decreases with an increase in incident light flux intensity directed at the first polarizer.

In still other embodiments, the magneto-optical light modulator includes a light source which can emit a light flux whose intensity is modulated. The light source may emit a light pulse. Also, the modulated incident light flux may be provided by a plurality of light sources.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 includes a diagram showing the relationship between intensity of incident light and an angle of magnetorotation of the magneto-optical component of FIG. 2A.

DESCRIPTION OF PREFERRED EMBODIMENTS

Figure 1:
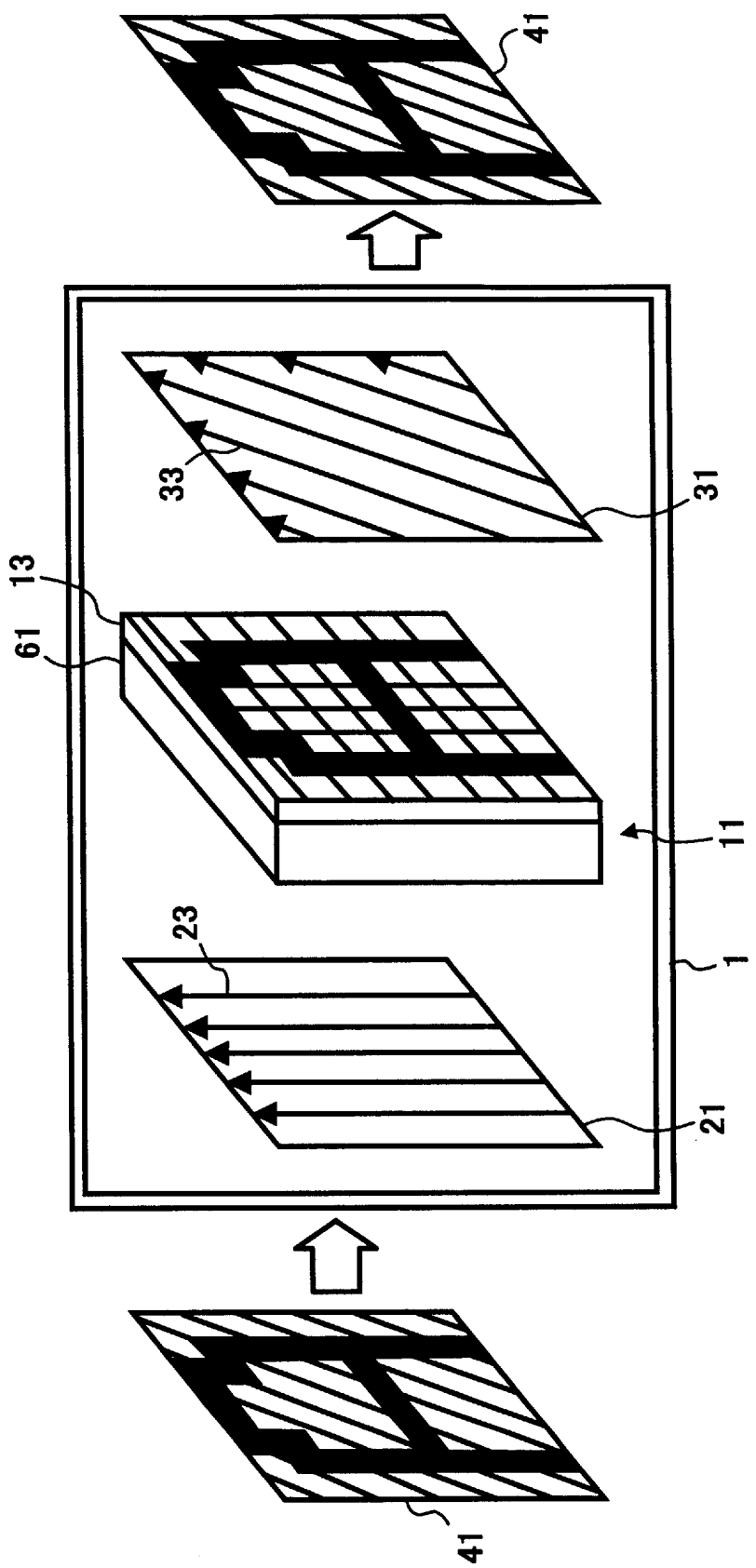
FIG. 1 is a schematic diagram illustrating a magneto-optical modulator according to an embodiment of the present invention.

Referring now to the drawings, wherein like reference numerals designate identical or corresponding parts throughout the several views, and more particularly referring to FIG. 1 thereof, there is shown an embodiment of the magneto-optical light modulator of the present invention.

The magneto-optical modulator 1 includes a magneto-optical component 11 which includes a transparent magneto-optical film 13 deposited on a substrate 61 having a grooved surface in which a plurality of straight grooves is formed, a first polarizer 21, and a second polarizer 31. The magneto-optical component 11, the first polarizer 21, and the second polarizer 31 are shown in FIG. 1, being enclosed by a double line. An example of a spatial pattern in intensity of incident light 41 is also illustrated in FIG. 1. Alternatively, the incident light flux may have a uniform spatial pattern. The incident light 41 is provided to the first polarizer 21. A plurality of arrows 23 and a plurality of arrows 33 denote respective axes of the first and the second polarizers. Each axis represents a direction parallel to a plane of polarization of the transmitted light.

Figure 2A:
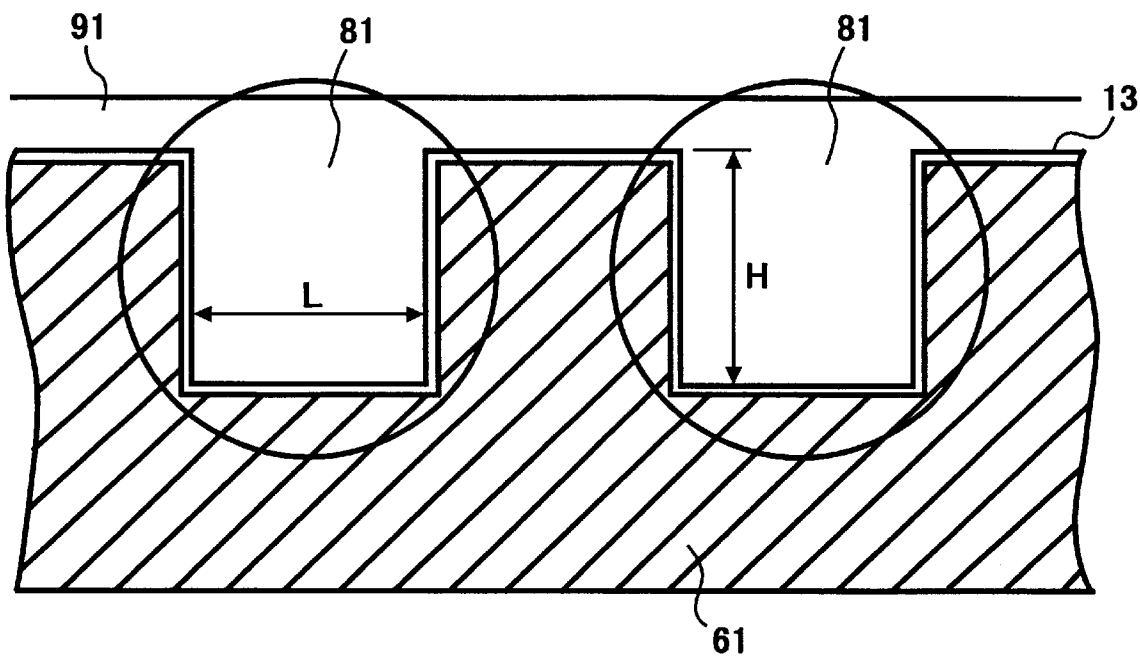
FIG. 2A is a cross sectional view of the magneto-optical component of the magneto-optical modulator of FIG. 1.
Figure 2B:
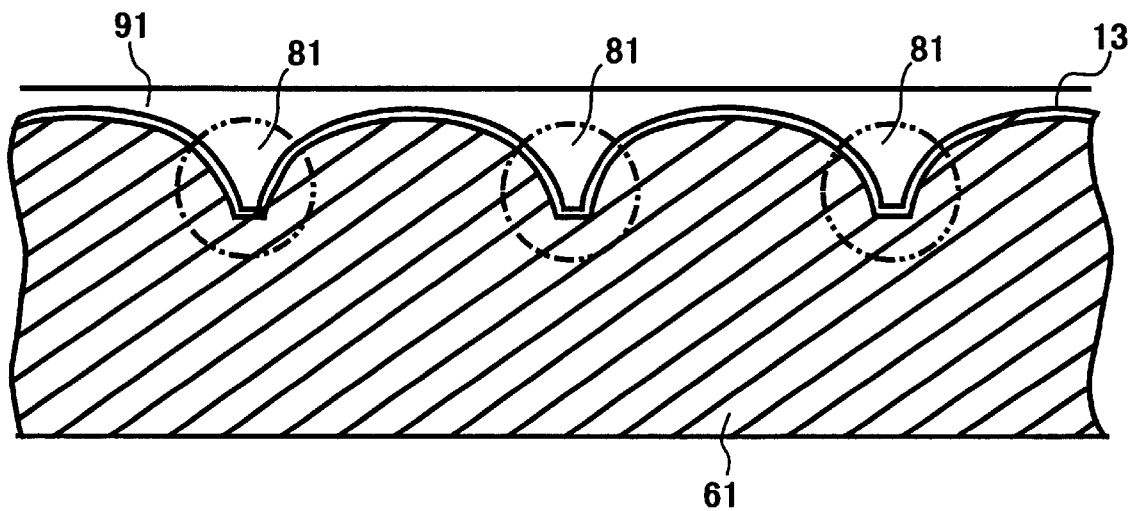
FIG. 2B is a cross sectional view of a magneto-optical component according to another embodiment of the present invention.

FIG. 2A is a schematic diagram illustrating a cross section of the magneto-optical component shown in FIG. 1, and FIG. 2B is a schematic diagram illustrating a cross section of a magneto-optical component according to another embodiment of the present invention. The transparent magneto-optical film 13 deposited on the grooved surface of the substrate 61 is explained hereinafter with reference to FIGS. 2A and 2B. The plurality of straight grooves is periodically formed on the substrate 61. Each straight groove is in parallel with the other grooves. The width is in a range of from 0.2 to 2 μm. The depth of the straight grooves is designed on the basis of a wavelength of light and magneto-optical properties of the transparent magneto-optical film 13. The depth is in a range of from 0.1 to 5 μm. The grooved surface may be formed using a transparent grating and photolithography. Alternatively, the grooved surface may be formed using a machining process.

The shape of a cross-section of the plurality of straight grooves may be, for example, rectangle, corrugation, or chopping surface, as shown in FIGS. 2A and 2B. As shown in FIG. 2A, the cross-section through a side surface of the groove can include a straight line segment. Alternatively, as shown in FIG. 2B, the cross-section through a side surface of the groove can include a curved line segment. Dimensions of the grooves can be designed so that the magneto-optical effect is enhanced by reflection through the transparent magneto-optical film 13 formed on the plurality of straight grooves.

As described above, the transparent magneto-optical film 13 can be deposited on the grooved surface. The transparent magneto-optical film 13 can be continuous over the whole grooved surface.

Alternatively, the transparent magneto-optical film may be discrete. Namely, the transparent magneto-optical film is disposed only on both side surfaces of the grooves. The "side surfaces of the grooves" correspond to a portion that is not parallel to the envelope surface (i.e., the major surface plane) for the grooved surface. For example, when the grooved surface is rectangular, a portion of the transparent magneto-optical film 13, which is deposited at the bottom portion and/or the top portion, may be removed from the substrate 61. Further, the transparent magneto-optical film 13 may be composed of a plurality of compositional layers.

In addition, after the transparent magneto-optical film 13 is deposited, a transparent protective layer 91 may be formed to cover the transparent magneto-optical film 13. The transparent protective layer 91 can fill up the concave portion 81 over the transparent magneto-optical film 13. The concave portion 81 is a portion that is illustrated in FIG. 2A or 2B, and is enclosed by a circle with a dotted line. In this case, the material for the protective layer 91 may be selected on the basis of the following reason for optimizing the magneto-optical modulator 1 so that the refractive index thereof is different from that of the substrate 61. Namely, it is considered that the magneto-optical effect is enhanced when incident light which has passed through the concave portion having a certain refractive index interferes light which has passed through the other portion (convex portion) having a different refractive index. The above-mentioned enhancement and the dependence of magneto-optical effect can also be achieved when there are no protective layers.

Next, operation of the optical modulator of the present invention is explained. An incident light flux 41 from a light source becomes a linearly polarized light flux after it passes through the first polarizer 21. Subsequently, a plane of polarization of the linearly polarized light is rotated when the polarized light passes through the transparent magneto-optical film 13 deposited on the grooved surface. The angle of magnetorotation depends on intensity of the incident light. The rotation angle increases with the increase of intensity of the incident light.

Subsequently, the second polarizer 31 is irradiated with the light flux whose plane of polarization is rotated. An angle between the axes 23 and 33 may be adjusted so that the second polarizer 31 has low transmittance for a light flux having small angle of magnetorotation. In this case, the second polarizer 31 has high transmittance for a polarized light flux with larger angle of magnetorotation. Namely, the magneto-optical modulator 1 operates as an optical switch through which an intensive light flux from the light source can pass ("on" or "high" state), and through which a weak light flux from the light source cannot pass ("off" or "low" state).

The above-mentioned angle between the axes 23 and 33 is generally designed on the basis of the difference of magnetorotation between intensive light and weak light. For example, a crossed Nicols may be used, in which the axis 33 of the second polarizer 31 is set perpendicular to that of the first polarizer 21. Specifically, operation other than that with the crossed Nicols is also possible. Further, by changing the angle between the axes 23 and 33, another mode of operation is also possible, which do not transmit an intensive light flux from the light source, but transmits a weak light flux.

Angle of magnetorotation by a transparent magneto-optical film of a rare earth iron garnet, MnBi, or Barium-ferrite remains constant with the variation of intensity of incident light, unless the magneto-optical film is deposited on the grooved surface.

In contrast, when the above-described substrate 61 is employed, known transparent magneto-optical materials, such as rare earth iron garnets, MnBi, and barium ferrite, may be used for the magneto-optical modulator of the present invention. In this case, a portion of incident light flux passes through a close field of the magneto-optical film 13, or is reflected with a shallow incident angle of reflection. This takes place at a concave portion 81. One factor which relates to the mechanism of this dependence on light intensity in the magneto-optical effect is the penetration depth of the light into the transparent magneto-optical film 13, which penetration depth depends on its intensity. Namely, it is considered that the magneto-optical effect is enhanced, when an intensive light deeply penetrates the transparent magneto-optical film 13.

Because a light velocity in a vacuum is about $3.0 \times 10^8$ m/s, a time length for transmitting the transparent magneto-optical film 13 with a dimension ranging from 0.1 to 5 μm is from 0.33 to 16.7 femtoseconds. Therefore, total transmittance of the magneto-optical modulator is modulated by the transmission through the active transparent magneto-optical film 13 having this dimension. Furthermore, the magneto-optical modulator 1 can switch transmission of light, and can modulate transmittance without any additional mechanically driven parts.

A light pulse may be used for the modulation of transmittance. As to the pulse width, a light pulse in the order of picoseconds has already been achieved. Namely, such short light pulses can be generated by a mode locking method using an optical modulator as a mode-locker. Further, a short light pulse having time width of 8 femtoseconds has been achieved using a method of optical pulse compression. The magneto-optical modulator of the present invention can utilize such short light pulses, and can switch transmittance of light with a short switching time in the order of femtoseconds.

As to the material used for the substrate 61, inorganic transparent materials such as quartz glass, sapphire, transparent crystallized glass, borosilicated glass, $Al_2O_3$, MgO, BeO, $ZrO_2$, $Y_2O_3$, $ThO_2$, CaO, GGG (gadolinium gallium garnet), and transparent plastic films such as methyl methacrylate, polymethylmethacrylate, polycarbonate, polypropylene, acrylic resin, styrene resin, acrylonitrile butadiene styrene resin, polyacrylate, polysulfone, polyether, sulfone, epoxy resin, methyl pentene resin, fluorinated polyimide, fluorocarbon resin, phenoxy resin, polyolefin, and nylon resin may be used. The transparent plastic film is used, for example, for the purpose of reducing weight, or for a case which requires flexibility of the substrate 61.

As to the first polarizer 21 and the second polarizer 31 commercially available polarizer films or high transmittance polarizers using a beam splitter may be used. There are several types of polarizer films such as multi-halogenated polarizer films, dye polarizer films, and metal polarizer films. Because dichroic materials used for the multi-halogenated polarizer films contain iodine, the optical properties of the multi-halogenated polarizer films show little wavelength dependence over the whole visible region. However, the multi-halogenated polarizer is easily deteriorated in an environment with high humidity or high temperature. The dye polarizer films have higher resistance against high humidity or high temperature than the multi-halogenated polarizer films.

Further, an additional protective layer may be coated on a surface of the above-mentioned polarizer film, because the surface is frequently damaged by the formation of cracks, when it is directly exposed to the outside.

As to the base material for the transparent magneto-optical film 13, a magneto-optical material which has a large figure of merit, or both large power of Faraday effect and high transparency, is preferred for the magneto-optical modulator of the present invention. Specifically, semitransparent magneto-optical materials may be used. The thickness of the transparent magneto-optical film 13 is designed on the basis of the magneto-optical properties and the size and configuration of the grooves.

For example, a magneto-optical film 13 which includes ultrafine ferromagnetic metal powders of iron, cobalt, or nickel, in which the powders have a mean particle size of the order of at most 50 nm, may be used for the magneto-optical modulator. In this case, the transparent magneto-optical film 13 also includes non-metal elements such as oxygen or carbon. The ultrafine powder structure effectively reduces light-absorption of the ferromagnetic films. The figure of merit is therefore improved. Further, coercive force of the magneto-optical film 13 can be adjusted to a suitable level by controlling particle size of the ultrafine ferromagnetic powders. The preferred thickness for the magneto-optical film 13 having ultrafine ferromagnetic metal powders of iron is in the range of from 5 to 120 nm for the visible light region, for example.

There are other usable materials such as oxides including rare earth iron garnets, MnBi, and barium ferrite; and materials with high birefringence such as MnBi, MnCuBi, and PtCo. The magneto-optical effect becomes large when a propagation direction of the light is parallel to the direction of magnetization in the magneto-optical film 13. Therefore, the magneto-optical film 13 having large magnetic anisotropy in the direction parallel to the propagation direction of light is suitable. With this context, an external magnetic field may be applied to the transparent magnetic film 13 during operation, in order to magnetize the film 13 with a direction parallel to the incident light. Alternatively, the transparent magnetic film may be magnetized in a suitable direction in advance. In any case, the magneto-optical modulator 1 can operate without an external magnetic field, or can operate under a constant external magnetic field.

These transparent magneto-optical film may be deposited using a known deposition method such as physical vapor deposition like sputtering method, vacuum deposition, or MBE (molecular beam epitaxy); CVD (chemical vapor deposition), or plating.

A light source for emitting light pulses may be a commercially available system. A wavelength of the laser pulses is selected according to the wavelength dependence of optical properties of the transparent magneto-optical film 13 and the polarizers.

Having generally described this invention, a further understanding can be obtained by reference to certain specific examples which are provided herein for purposes of illustration only and are not intended to be limiting.

EXAMPLE 1

A $CrO_2$ layer can be deposited on a quartz substrate 61 with a thickness of 1 mm. Subsequently, a Cr layer can be deposited on the $CrO_2$ layer, where the total thickness of the $CrO_2$ layer and the Cr layer is 120 nm. Next, a positive photoresist can be coated on the Cr layer, and the photoresist can be exposed to ultraviolet light through a photomask that is placed over the photoresist to have the width L of the groove of 1 µm, as shown in FIG. 2A.

The photoresist is etched by a wet-etching method. In addition, a portion of the Cr layer that was exposed by the wet-etching method is further etched by a subsequent wet-etching method. Further, a portion of the quartz substrate 61, which was exposed by the above-mentioned wet-etching method, is further etched using a fluorine-based gas to have the depth of the groove H of 0.65 µm. Finally, the residuary photoresist and the Cr layer, if any, are peeled off from the quartz substrate 61, and thereby a grooved surface is formed on the substrate 61.

A transparent magneto-optical film 13 including a plurality of iron fine particles is deposited on the grooved quartz substrate 61 by a vacuum evaporation method. Argon gas is introduced into a vacuum chamber during deposition with a flow rate of 50 CCM (cc per minute), in which the measured total pressure is adjusted to be 1.0 Pa. The mean thickness of the transparent magneto-optical film 13 is 100 nm. The mean particle size of the iron fine particles, which is determined with TEM (transmission electron microscope) image, is 6 nm. The thus formed transparent magneto-optical film 13 contains iron, oxygen, carbon, and nitrogen, and the content of iron is analyzed to be 66%. Coercive force of the flat portion of the transparent magneto-optical film is 320 Oe. A ratio of residual magnetization to saturated magnetization is 0.8 with respect to the direction parallel to the film plane. The transparent magneto-optical film 13 is formed to have a magnetic anisotropy in a film plane.

Subsequently, wavelength dependence of magneto-optical effect of the transparent magneto-optical film 13 is measured using an apparatus for measuring magneto-optical effect, Model K250 manufactured by JASCO Corporation Japan. The angle of magnetorotation reaches a maximum at a wavelength of 633 nm. A hysteresis loop of the magnetorotation at wavelength of 633.7 nm is measured, varying intensity of applied magnetic field of up to 10 kilo gauss, where power levels of respective incident light fluxes are adjusted to be 2.2 µW, 3.0 µW, and 3.8 µW. Currents of a xenon lamp for emitting light fluxes with powers of 2.2 µW, 3.0 µW, and 3.8 µW are 5 A, 6.5 A, and 8 A, respectively. The angles of magnetorotation for the above-mentioned three power values at an external magnetic field of zero gauss are 4.7, 6.0, and 7.0 degrees, respectively, as shown in FIG. 3. The angle of magnetorotation increases with the increase of intensity of incident light. Transmittance of the magneto-optical modulator 1 at a wavelength of 635 nm is 4%.

Accordingly, a magneto-optical modulator 1 is obtained by adjusting aforementioned angle between the axes 23 and 33 so that the light flux with power of 3.8 µW is transmitted by the second polarizer 31. The magneto-optical modulator 1 shuts the light flux with power of 2.2 µW, thereby the optical modulator I operates as an magneto-optical shutter.

EXAMPLE 2

A first laser light source that emits a first laser beam with a wavelength of 628.8 nm and a second light source that emits a second laser beam are employed. Optical axes of the two laser beams are adjusted so that the first laser beam overlaps the second laser beam at the position of the magneto-optical modulator 1. In addition, the transparent magneto-optical film 13 is disposed so that the plane of polarization of the incident light is set perpendicular to the direction of the straight grooves. The axis 33 of the second polarizer 31 is set in a direction such that the second polarizer 31 transmits light when the two laser beams overlap each other. In this case, the first laser beam alone cannot be transmitted through the second polarizer 31, due to small rotation of the plane of polarization.

For example, when the magneto-optical 1 is alternatively irradiated with laser beams which are alternatively emitted from the first laser source and the second laser source with a pulse width of 100 femtoseconds, transmittance for each laser beam is in a "low" state.

In contrast, when the first laser source and the second laser source respectively emit a first series of light pulses with a pulse width of 100 femtoseconds and a second series of light pulses with a pulse width of 200 femtoseconds so that a portion of the second light pulses overlap the first light pulses, transmittance in a "high" state is observed only in the overlapped portion.

EXAMPLE 3

A transparent magneto-optical layer having the same structure as that of the first embodiment is further processed by an anisotropical etching method using an ECR (electron cyclotron resonance) etching apparatus so that the portions of transparent magneto-optical film 13 in a top and a bottom portions are removed. Namely, only a portion of the transparent magneto-optical film on the both sides of the grooves are left on the substrate 61. The thus prepared magneto-optical component shows maximum angle of magnetorotation at a wavelength of 634.5 nm. Then, a hysteresis loop is measured at a wavelength of 635 nm by varying applied magnetic field of up to 10 kilo gauss. The magnetorotation observed for current levels of 5, 6.5, and 8 A for a xenon light source is 4.4 degrees, 5.6 degrees, and 5.8 degrees, respectively. The angle of magnetorotation is approximately proportional to the intensity of the incident light. Transmittance of the magneto-optical modulator 1 at 635 nm is improved to be 8% by the above-described anisotropical etching. As a result, the S/N (signal to noise ratio) is also improved.

Comparative Example 1

The magneto-optical effect of a transparent magneto-optical film that is deposited on a flat surface of a quartz substrate with the same deposition conditions for the first example has no dependence on intensity of incident light. Namely, the angle of magnetorotation by the transparent magneto-optical film that includes iron fine particles is constant with the variation of intensity of incident light.

Comparative Example 2

Bismuth-substituted rare earth iron garnet with a thickness of 900 nm is deposited on a substrate 61 having the same structure of the substrate 61 of example 1 using a sputtering method. The composition of the sputtering target is expressed by a formula of $Bi_2GdFe_{3.8}Al_{1.2}O_{12}$. The substrate 61 is heated to the temperature of 400° C. during sputtering, and then the sputtered magnetic film is annealed at the temperature of 680° C. in air for three hours. Coercive force of a bismuth-substituted rare earth iron garnet film, which was simultaneously sputtered on a reference glass substrate, is 400 Oe, where the shape of the hysteresis loop thereof indicates existence of strong perpendicular magnetic anisotropy of the magnetic film. In the wavelength dependence of an angle of magnetorotation, the angle reaches a maximum value at wavelength near 520 nm. However, the angle of magnetorotation by the magneto-optic effect is invariant with the variation of intensity of incident light with a wavelength of 520 nm, where maximum applied magnetic field for the measurement is 10 kilogauss.

As described above in detail, the present invention provides a novel magneto-optic modulator that modulates transmittance of incident light from a light source.

Obviously, numerous modifications and variations of the embodiments disclosed herein are possible in light of the above teachings. It is therefore to be understood that within the scope the appended claims, the invention may be practiced otherwise than as specifically described herein.

The disclosure of the priority document, Japanese Patent Application No. 10-123583, which was filed in the Japanese Patent Office on May 6, 1998, is incorporated by reference herein in its entirety.

What is claimed is:

1. A magneto-optical light modulator comprising
   a first polarizer arranged to receive an incident light flux and to transmit a polarized light flux;
   a transparent magneto-optical component arranged to receive the polarized light flux and to transmit a rotated polarized light flux; and
   a second polarizer arranged to receive the rotated polarized light flux, wherein
   the transparent magneto-optical component comprises a substrate including at least one textured surface substantially parallel to a major surface plane of the substrate;
   the at least one textured surface includes features having a depth in a range of from about 0.1 µm to about 5 µm with a side surface that is not parallel to the major surface plane;

a magneto-optical film between about 5 nm and about 200 nm thick covers at least a portion of the side surface; and the magneto-optical light modulator further comprises at least one modulated intensity light source irradiating the transparent magneto-optical component.

2. The magneto-optical light modulator according to claim 1, wherein the at least one modulated intensity light source comprises at least one source of discrete light pulses.

3. The magneto-optical light modulator according to claim 1, wherein an axis of the second polarizer that corresponds to a plane of polarization is oriented such that a transmittance of the rotated polarized light flux through the second polarizer increases with an increase of intensity of the incident light flux.

4. The magneto-optical light modulator according to claim 1, wherein the features are substantially uniform in shape and size.

5. The magneto-optical light modulator according to claim 1, wherein the features are spaced periodically on the at least one textured surface.

6. The magneto-optical light modulator according to claim 1, wherein the at least one textured surface is two opposing textured surfaces.

7. The magneto-optical light modulator according to claim 1, wherein the features on the at least one textured surface comprise a plurality of parallel grooves having a width in a range of from about 0.2 $\mu$m to about 2 $\mu$m.

8. The magneto-optical light modulator according to claim 7, wherein the parallel grooves are spaced periodically on the at least one textured surface.

9. The magneto-optical light modulator according to claim 1, wherein a cross-section perpendicular to the major surface plane of the side surface comprises at least one curved line segment.

10. The magneto-optical light modulator according to claim 1, wherein across-section perpendicular to the major surface plane of the side surface comprises at least one straight line segment.

11. The magneto-optical light modulator according to claim 10, wherein the at least one straight line segment is substantially perpendicular to the major surface plane.

12. The magneto-optical light modulator according to claim 1, wherein the magneto-optical film comprises at least one of a rare earth iron garnet, MnBi, barium ferrite, MnBi, MnCuBi, PtCo, Fe, Co and Ni.

13. The magneto-optical light modulator according to claim 1, further comprising a protective layer on the at least one magneto-optical film.

14. The magneto-optical light modulator according to claim 1, wherein a propagation direction of the polarized light flux from the first polarizer is parallel to a direction of magnetization in the at least one magneto-optical film.

15. A method of modulating light, the method comprising directing an incident light flux through a first polarizer to form a polarized light flux;

directing the polarized light flux through a transparent magneto-optical component to form a rotated polarized light flux; and directing the rotated polarized light flux to a second polarizer, wherein the transparent magneto-optical component comprises a substrate including at least one textured surface substantially parallel to a major surface plane of the substrate;

the at least one textured surface includes features having a depth in a range of from about 0.1 $\mu$m to about 5 $\mu$m with a side surface that is not parallel to the major surface plane;

a magneto-optical film between about 5 nm and about 200 nm thick covers at least a portion of the side surface; and the incident light flux comprises a constant light flux and at least one modulated intensity light flux.

16. The method according to claim 15, wherein the modulated light flux comprises at least one discrete light pulse.

17. The method according to claim 15, further comprising orienting a second polarizer axis, which corresponds to a plane of polarization of the second polarizer, in a direction such that a transmittance of the rotated polarized light flux through the second polarizer increases with an increase of intensity of the incident light flux.

18. The method according to claim 15, further comprising orienting a second polarizer axis, which corresponds to a plane of polarization of the second polarizer, in a direction such that a transmittance of the rotated polarized light flux through the second polarizer decreases with an increase of intensity of the incident light flux.

* * * * *